United States Patent [19]

McClelland

[11] 3,972,537
[45] Aug. 3, 1976

[54] CHUCK ACTUATOR ASSEMBLY

[75] Inventor: Alex J. McClelland, Cleveland, Ohio

[73] Assignee: The Warner & Swasey Company, Cleveland, Ohio

[22] Filed: Jan. 9, 1975

[21] Appl. No.: 539,620

[52] U.S. Cl. .................................. 279/4; 91/420
[51] Int. Cl.² ........................................ B23B 31/12
[58] Field of Search ............. 279/4; 91/420; 92/60

[56] References Cited
UNITED STATES PATENTS

| 3,641,875 | 2/1972 | Kodalle | 91/420 X |
| 3,892,165 | 7/1975 | Lioux | 91/420 |

Primary Examiner—Othell M. Simpson
Assistant Examiner—Z. R. Bilinsky

[57] ABSTRACT

An improved chuck actuator assembly includes a fluid motor which is utilized to open and close a chuck. The actuator motor is effective to apply forces to the chuck to hold it closed during rotation of a workpiece. In the event of an accidental loss of fluid pressure to the actuator motor, a check valve is closed to prevent the exhausting of large quantities of fluid from the motor. However, as the check valve closes, a small quantity of fluid is discharged from the actuator motor. The loss of even a small quantity of fluid could tend to cause the chuck to relax its grip on the workpiece. To prevent this from happening, a compensator assembly is provided to maintain the fluid pressure in the actuator motor chamber substantially constant by making up for the small quantity of fluid which is lost upon closing of the check valve. The compensator assembly includes a piston which is moved under the influence of a biasing spring. This movement of the piston discharges fluid from an auxiliary chamber into the motor chamber to thereby makeup for the fluid which is lost during the closing of the check valve. The spring pressure bias against the piston is effective to maintain the fluid pressure in the motor chamber substantially constant so that the forces urging the chuck closed remain substantially constant. The compensator assembly is advantageously mounted on the main piston in the actuator motor and is rotated with the actuator motor during operation of the machine tool.

5 Claims, 12 Drawing Figures

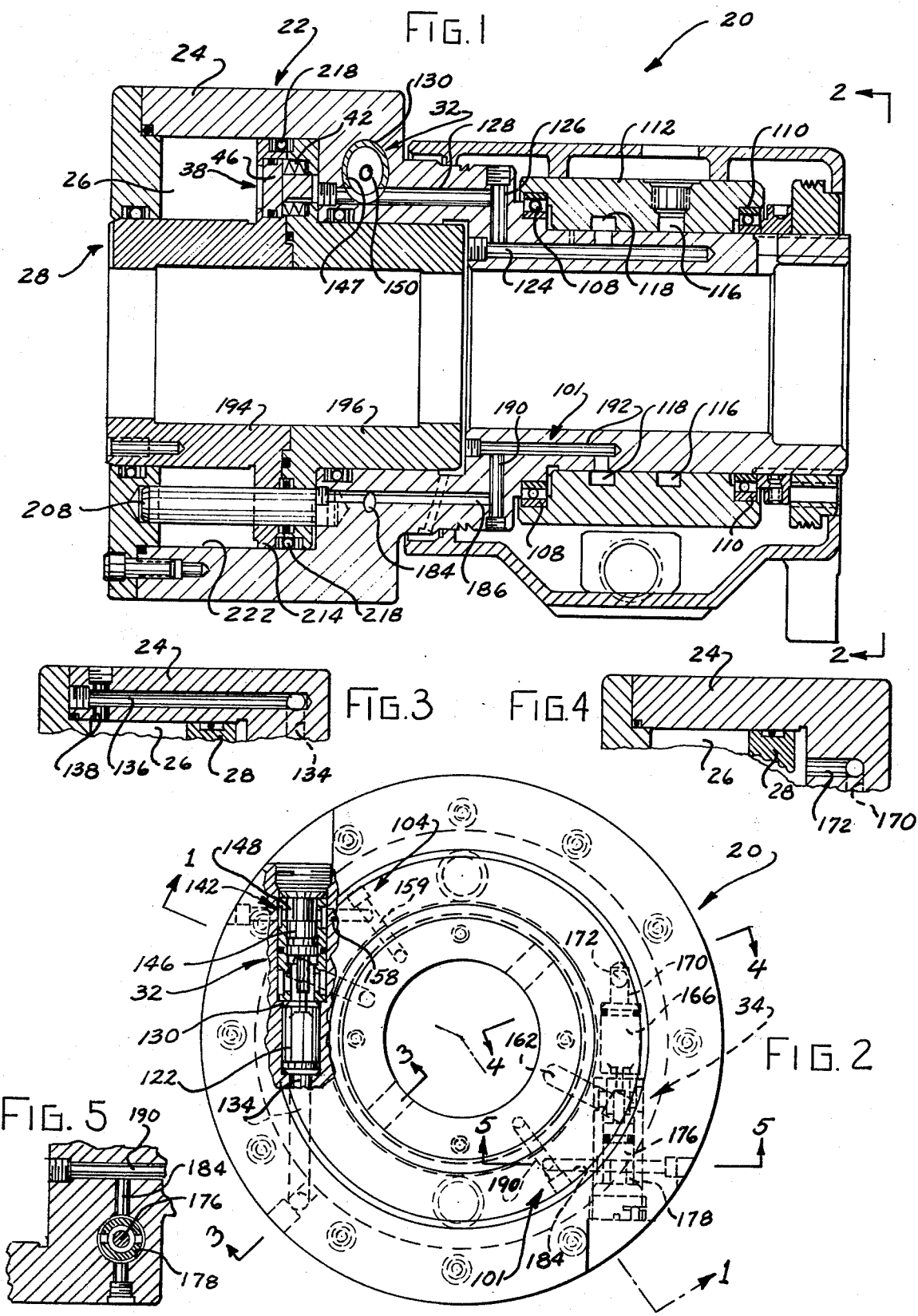

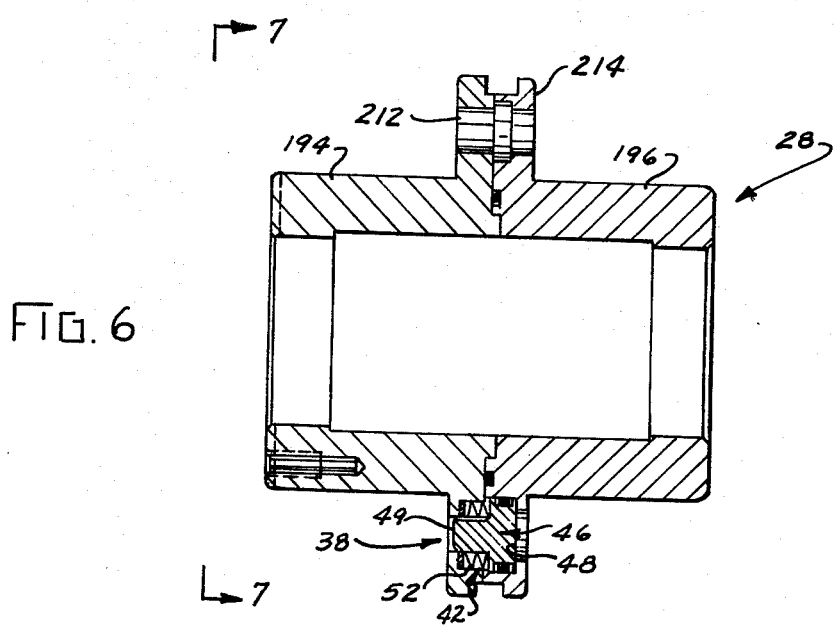
FIG. 6
FIG. 7
FIG. 8
FIG. 9
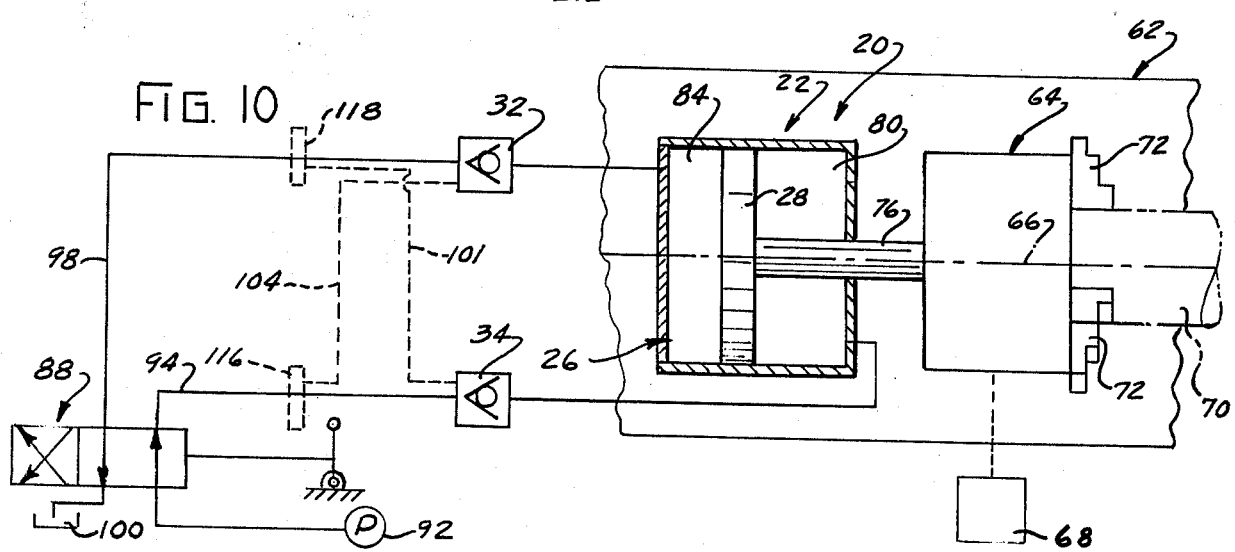
FIG. 10

CHUCK ACTUATOR ASSEMBLY

BACKGROUND OF THE INVENTION

The present invention relates to a new and improved machine tool, and more specifically to an improved chuck actuator assembly.

Many machine tools, such as the machine tool disclosed in U.S. Pat. No. 3,835,516 to Fullerton include a chuck which is utilizied to grip and rotate a workpiece. A hydraulic motor is commonly provided to open and close the chuck. During operation of the machine tool, the chuck jaws are held closed under the influence of high-pressure fluid in the motor.

If the conduit which supplies high-pressure fluid to the motor is accidentally broken during operation of the machine tool of if the power for driving the pump to supply the fluid pressure to the motor is interrupted, the exhausting of fluid from the motor chamber could cause the chuck to lose its grip on the workpiece. Of course if the workpiece is rotating at a relatively high speed, this could result in a serious accident. In order to prevent the exhausting of fluid from the motor chamber upon accidental rupturing of the fluid supply conduit during operation of the machine tool, check valves have been associated with the supply conduits for the motor chamber in a manner similar to that disclosed in U.S. Pat. Nos. 3,364,823; 3,411,415; and 3,596,567. Although these known check valve arrangements have been more or less successful in their mode of operation, difficulty may be encountered due to the loss of a relatively small quantity of fluid from the motor chamber of the chuck actuator assembly upon closing of the check valve. This loss of even a relatively small quantity of fluid from the motor chamber could result in a tendency for the chuck to relax its grip on the workpiece.

SUMMARY OF THE PRESENT INVENTION

The present invention provides an improved chuck actuator assembly which is effective to maintain a substantially constant force urging a chuck toward a closed condition upon interruption of the supply of high-pressure fluid to the chuck actuator assembly. The chuck actuator assembly includes a check valve which is closed upon breaking of the high-pressure fluid conduit to prevent the exhausting of large quantities of fluid from the motor chamber. However as the check valve closes, a relatively small quantity of fluid is lost from the motor chamber of the chuck actuator assembly.

In accordance with a feature of the present invention, a compensator arrangement is provided to maintain the fluid pressure in the motor chamber substantially constant by compensating for the small quantity of fluid which is lost upon closing of the check valve. The pressure compensator arrangement includes a piston which is movable under the influence of a biasing spring. In a specific preferred embodiment of the invention, movement of the piston is effective to discharge fluid from an auxiliary chamber to the motor chamber to make up for the fluid which is lost upon operation of the check valve. In order to simplify hydraulic connections with the actuator motor, the pressure compensator arrangement is advantageously mounted on the main piston of the actuator motor and is rotated with the motor and the chuck during operation of the machine tool.

Accordingly, it is an object of this invention to provide a new and improved machine tool having chuck actuator assembly with a compensator to maintain the fluid pressure in an actuator motor chamber substantially constant upon closing of a check valve even though a small quantity of fluid is lost from the motor chamber as the check valve closes.

Another object of this invention is to provide a new and improved machine tool having a chuck actuator assembly with a check valve which is closed in response to a reduction in fluid pressure in a high-pressure fluid supply conduit during operation of the machine tool and wherein a biasing spring is effective to expand a variable volume chamber to compensate for the loss of fluid from an actuator motor chamber upon operation of the check valve to the closed condition.

Another object of this invention is to provide a new and improved machine tool having a chuck actuator assembly with a check valve to prevent the exhausting of large volumes of fluid from an actuator motor chamber upon a reduction of fluid pressure in a supply conduit and wherein a variable volume chamber connected in fluid communication with the motor chamber is contracted to discharge a volume of fluid sufficient to make up for a relatively small quantity of fluid lost from the motor chamber upon closing of the check valve.

BREIF DESCRIPTION OF THE DRAWINGS the foregoing and other objects and features of the present invention will become more apparent upon a consideration of the following description taken in connection with the accompanying drawings wherein:

FIG. 1 is a sectional view, taken generally along the line 1—1 of FIG. 2, illustrating an improved chuck actuator constructed in accordance with the present invention;

FIG. 2 is a partially broken away sectional view, taken generally along the line 2—2 of FIG. 1, illustrating check valve assemblies in te chuck actuator of FIG. 1;

FIG. 3 is a fragmentary section view, taken generally along the line 3—3 of FIG. 2, illustrating a passage for connecting one of the check valve assemblies in fluid communication with one end portion of a motor chamber in the chuck actuator of FIG. 1;

FIG. 4 is a fragmentary sectional view, taken generally along the line 4—4 of FIG. 2, illustrating a passage for connecting the other check valve assembly in fluid communication with the opposite end of the motor chamber;

FIG. 5 is a sectional view, takne generally along the line 5—5 of FIG. 2, further illustrating the construction of a check valve assembly;

FIG. 6 is a sectional view, taken generally along the line 6—6 of FIG. 7, illustrating the construction of a piston utilized in a motor of the chuck actuator of FIG. 1;

FIG. 7 is an end view, taken along the line 7—7 of FIG. 6, illustrating the arrangement of a plurality of compensator assemblies on the actuator motor piston;

FIG. 8 is a sectional view, taken generally along line 8—8 of FIG. 7, further illustrating the construction of the motor piston;

FIG. 9 is a fragmentary sectional view, taken generally along the line 9—9 of FIG. 7, further illustrating the construction of the actuator motor piston;

FIG. 10 is a schematic illustration of a machine tool having a chuck actuator assembly constructed in accordance with the present invention;

DESCRIPTION OF ONE SPECIFIC PREFERRED EMBODIMENT OF THE INVENTION

Figure 11:
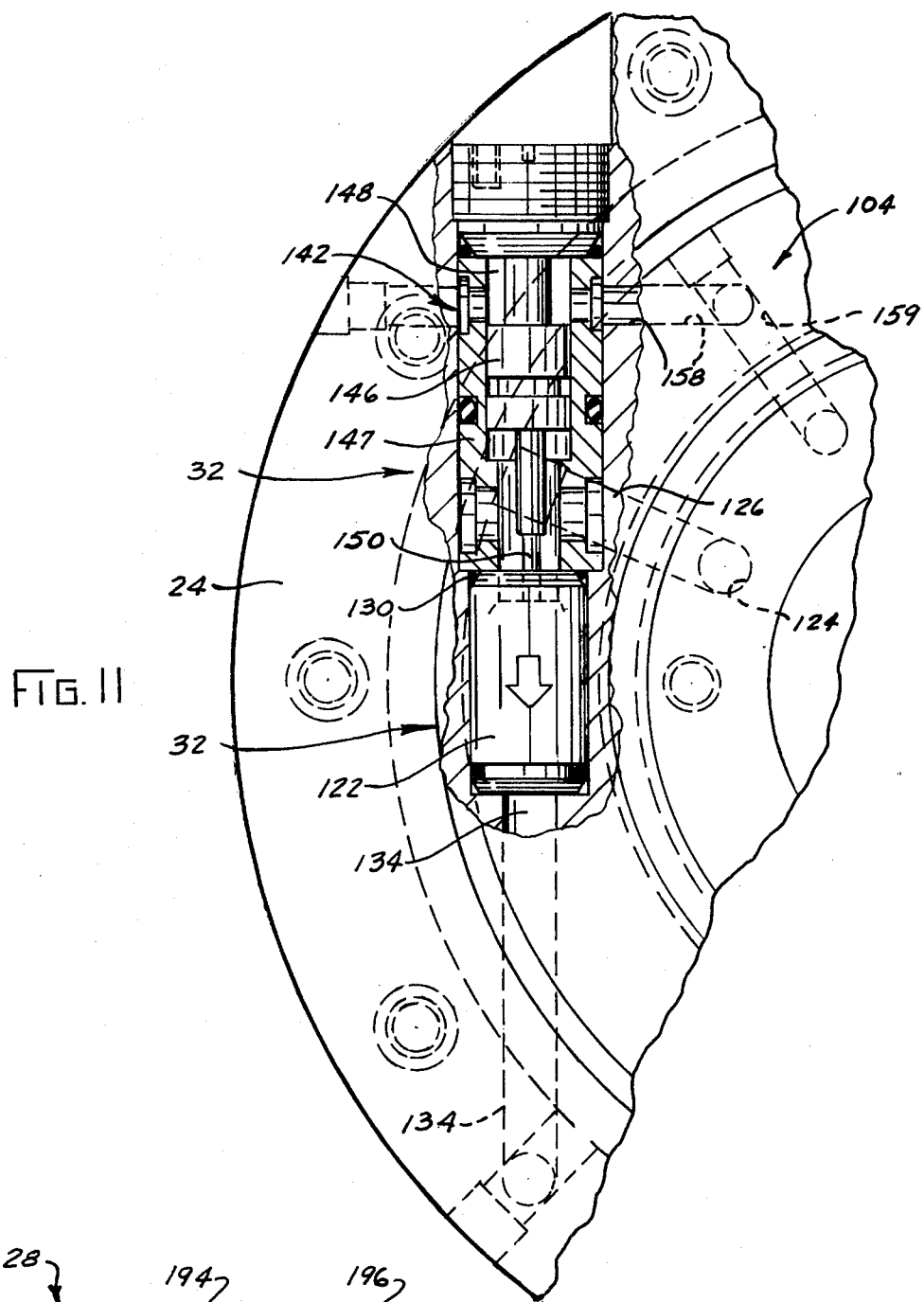
FIG. 11 is an enlarged fragmentary illustration further depicting the construction of one of the check valve assemblies of FIG. 2.

An improved chuck actuator assembly 20 (see FIG. 1) is utilized to operate a known chuck between the opened and closed conditions and to hold the chuck closed during machine operations. The chuck actuator assembly 20 includes a hydraulic motor 22 having a cylinder 24 which defines a motor chamber 26 in which a piston 28 is slidably disposed. During operation of an associated machine tool, the piston 28 is urged toward one end of the motor chamber 26 under the influence of fluid pressure forces to apply a force to the chuck holding it closed. A pair of check valve assemblies 32 and 34 (see FIG. 2) are provided in the chuck actuator assembly 20 to prevent the exhausting of relatively large quantities of fluid from the motor chamber 26 (FIG. 1) if the supply of high-pressure fluid to the chuck actuator assembly should be interrupted during operation of the machine tool. However, upon closing of one of the check valve assemblies 32 or 34, a relatively small quantity of fluid is lost from the motor chamber 26. The loss of even a small quantity of fluid from the motor chamber 26 tends to reduce the pressure in the motor chamber with a resulting reduction in the force holding the chuck closed.

In accordance with a feature of the present invention, a plurality of identical compensator assemblies 38 (see FIGS. 1, 6, 7 and 12) are provided in association with the actuator motor 22 to maintain the fluid pressure in the motor chamber 26 constant upon closing of one of the check valve assemblies 32 or 34 even though a small quantity of fluid is lost from the motor chamber. To make up for the loss of a small quantity of fluid from the motor chamber 26 upon closing of a check valve assembly 32 or 34, the compensator assemblies 38 are effective to discharge fluid from auxiliary chambers or cylinders 42 (see FIG. 12) to the motor chamber 26. Each of the compensator assemblies 38 (FIG. 7) is mounted on the motor piston 28 and includes a piston 46 (FIG. 12) having a head end surface 48 which is exposed to the relatively high fluid pressure in the motor chamber 26 and a tail end surface 49. The pressure against the head end surface 48 of a piston 46 presses it inwardly against the influence of biasing springs 52 which, in the illustrated embodiment of the invention, are of the well known Belleville type. It should be noted that the piston 46 divides the associated auxiliary chamber 42 into two variable volume sections or chambers 56 and 58. The springs 52 are located in the variable volume chamber 56 and are effective to urge the piston 46 outwardly, that is toward the right as viewed in FIG. 12.

Figure 12:
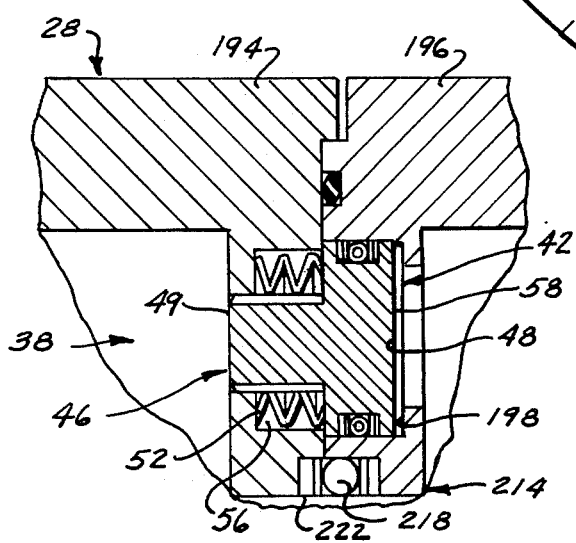
FIG. 12 is an enlarged fragmentary illustration further illustrating the construction of one of the compensator assemblies.

During normal operation of the actuator assembly 20, fluid under pressure is tored stored the variable volume chamber 58 (FIG. 12). Upon closing of one of the check valve assemblies 32 or 34 and a resulting loss of a small quantity of fluid from the motor chamber 26, the springs 52 are effective to move the piston 46 toward the right (as viewed in FIG. 12). This rightward movement of the piston 46 decreases the size of the variable volume chamber 58 and discharges fluid into the motor chamber 26. The fluid discharged from the chamber 58 into the motor chamber 26 maintains the fluid pressure in the motor chamber substantially constant even though a small quantity of fluid is lost from the motor chamber as one of the check valve assemblies 32 or 34 closes.

Although the improved chuck actuator assembly 20 could be utilized in association with many different types of machine tools, it is illustrated schematically in FIG. 10 in association with a machine tool 62 constructed in accordance with U.S. Pat. No. 3,835,516. The machine tool 62 includes a spindle chuck 64 which is rotated about its central axis 66 by a drive motor 68 to rotate a workpiece 70 about the axis 66. As the spindle chuck 64 is rotating the workpiece 70 about the axis 66, chuck jaws 72 are continuously pressed against the outer surface of the workpiece to securely grip it and hold it in place in the chuck 64. To provide for this continuous gripping action, a chuck actuator shaft 76 is connected with the piston 28 in the hydraulic motor 22. Fluid pressure in one end portion 80 of the motor chamber 26 urges the piston 28 toward the left (as viewed in FIG. 10) to continuously apply a force pulling the chuck actuator shaft 76 back or toward the left as viewed in FIG. 10.

The manner in which the chuck actuator 20 cooperates with the chuck 64 to maintain a continuous gripping action on the workpiece 70 is the same as is disclosed in U.S. Pat. No. 2,546,326 to Wetzel and will not be repeated herein to avoid prolixity of description. However, it should be noted that the actuator assembly 20 could be utilized in association with a chuck of push-out type rather than the pull-back type. If the actuator assembly 20 was utilized in association with a chuck of the push-out type, the left end portion 84 of the motor chamber 26 would be pressurized to continuously push the piston 28 toward the right (as viewed in FIG. 10) to maintain a continuous gripping action on the workpiece 70. The compensator assemblies 38 are oriented so as to be effective during operation of the actuator assembly 20 with either a push-out or a pull-back type chuck.

When the chuck 64 is in an open or loading condition in which the jaws 72 are spaced apart, the piston 28 is disposed adjacent to the right end (as viewed in FIGS. 1 and 10) of the motor chamber 26. At this time the control valve 88 is in an actuated position to the right of the position shown in FIG. 10 so that high pressure fluid from the pump 92 is connected with the conduit 98. The conduit 98 is connected with the check valve assembly 32 and the left end 84 of the motor chamber 26. The right end 80 of the motor chamber 26 is connected with drain 100 through the check valve assembly 34, conduit 94 and control valve 88. The check valve assembly 34 is held in the open condition under the influence of fluid pressure transmitted through passages indicated schematically at 101 in FIG. 10.

After the workpiece 70 has been positioned in the chuck 64 in a known manner, the control valve 88 is operated to the actuated condition of FIG. 10 to port high pressure fluid from the pump 92 through the fluid conduit 94 to the check valve assembly 34 which is connected with the right (as viewed in FIGS. 1 and 10) end portion 80 of the motor chamber 26. In addition, operation of the control valve 88 to the actuated position of FIG. 10 connects the fluid conduit 98 with tank or drain 100. The conduit 98 is connected with the left end (as viewed in FIG. 10) of the motor chamber 26 through the check valve assembly 32. It should be noted that the check valve assembly 32 is held in the open condition under the influence of fluid pressure transmitted through a conduit indicated schematically at 104 in FIG. 10 so that fluid can be exhausted from the motor chamber 26 as the piston 28 moves rearwardly or toward the left to close the chuck 64.

During normal operation of the machine tool 62, the chuck 64 and hydraulic motor 22 are rotated about the common central axis 66 at a relatively high speed by the drive motor 68. To provide for this high speed rotation of the hydraulic motor 22, the motor cylinder 24 is rotatably supported on a pair of axially spaced-apart bearing assemblies 108 and 110 (see FIG. 1). The bearing assemblies 108 and 110 are connected with a stationary support 112 which also functions as a manifold to conduct fluid between the stationary conduits 94 and 98 and passages in the rotating motor cylinder 24.

The generally cylindrical support member 112 is provided with an annular manifold ring 116 (FIG. 1) which is connected in continuous fluid communication with the conduit 94. During operation of the actuator motor 22 and movement of the piston 28 toward the left (as viewed in FIG. 10), the manifold ring 116 enables high pressure fluid to flow from the conduit 94 to the check valve assembly 34 and motor chamber 26. At the same time, a relatively high fluid pressure is conducted from the manifold ring 116 to the check valve assembly 32 through the conduit 104 (FIG. 10). This fluid pressure is utilized to maintain the check valve assembly 32 in the open condition. Of course, during operation of the motor 22 in the opposite direction, the manifold ring 116 receives fluid exhausted from the motor chamber 26 through the check valve assembly 34.

A second annular manifold ring 118 (FIG. 1) is connected in continuous fluid communication with the conduit 98. During operation of the actuator motor 22 and movement of the piston 28 toward the right (as viewed in FIG. 10), the manifold ring 118 enables high pressure fluid to flow from the conduit 98 to the check valve assembly 32 and motor chamber 26. At the same time, a relatively high fluid pressure is conducted from the manifold ring 118 to the check valve assembly 34 through the conduit 101. This fluid pressure is utilized to maintain the check valve assembly 34 in the open condition. Of course, during operation of the motor 22 in the opposite direction, the manifold ring 118 receives fluid exhausted from the motor chamber 26 through the check valve assembly 32.

During operation of the machine tool 62 with the pull-back type chuck 64, high pressure fluid is continuously conducted through the conduit 94 to the manifold ring 116 which is connected with the check valve assembly 34 mounted in the rotating cylinder 22. The relatively high pressure fluid flows through the open check valve assembly 34 to the end portion 80 of the motor chamber 86. This fluid pressure is effective to continuously urge the chuck 64 closed. The manifold ring 118 is continuously connected with drain through the conduit 98. The relatively low or tank pressure is conducted through the opened check valve 32 to the end portion 84 of the motor chamber 26.

When machining operations on the workpiece 70 have been completed and the chuck 64 and motor 22 have stopped rotating under the influence of the motor 68, the valve 88 is actuated to connect the conduit 94 with drain and to connect the pump 92 with conduit 98. This results in high pressure fluid being conducted to the end portion 84 of the motor chamber 26 to move the piston 28 toward the right (as viewed in FIG. 10). Of course, this rightward movement of the piston 28 causes the chuck 64 to open to release its grip on the workpiece 70.

The check valve assembly 32 includes a check valve 122 (FIGS. 2 and 11) of the cartridge type similar to Model 2206 manufactured by Kepner Products Company of 7321 West 59 Street, Summit, Illinois. The check valve 122 is operated to an open condition to enable high pressure fluid to freely flow in the direction of the arrow in FIGS. 2 and 11. Thus, high pressure fluid can flow from the manifold ring 118 (see FIG. 1) through the motor cylinder passages 124, 126 and 128 to the check valve chamber 130. The high pressure fluid in the chamber 130 causes the check valve 122 (see FIG. 11) to open to port high pressure fluid to a passage 134 (FIGS. 3 and 11). The passage 134 is connected with the left end portion 84 of the motor chamber 26 by a pair of passages 136 and 138 (see FIG.3). Therefore, high pressure can flow from the manifold ring 118 through the passages 124, 126 and 128 to he check valve 122 and from the check valve 122 through the passages 134, 136 and 138 to the left end portion of the motor chamber 26.

During normal operation of the machine tool 62, the control valve 88 (see FIG. 10) is actuated to connect the left hand portion 84 of the motor chamber 26 with drain through the check valve assembly 32. The check valve 122 normally prevents a flow of fluid from the motor chamber 26 and must be operated to an open condition by a check valve actuator assembly 142 (see FIGS. 2 and 11). The check valve actuator assembly 142 includes a shuttle 146 (FIG. 11) which is slidably disposed in a generally cylindrical spacer 147. To open the check valve 122, the shuttle 146 is moved downwardly (as viewed in FIG. 11) under the influence of fluid pressure conducted to a chamber 148 through the conduit indicated at 104 in FIG. 10. This downward movement of the shuttle 146 causes a leading or nose portion 150 (FIG. 11) of the shuttle 146 to open the check valve 122.

When the check valve 122 has been opened in this manner, relatively low pressure flows along a path extending from the motor chamber 26 through the passage 138 (FIG. 3) and passage 136 to the passage 134 (see FIGS. 3 and 11). The fluid flows from the passage 134 through the open check valve 122 to the manifold ring 118 (see FIG. 1) through the passages 124, 126 and 128. Thus during operation of the machine tool 162, the left end portion 84 of the motor chamber 26 is continuously exhausted to drain through the open check valve 122.

In order to maintain the check valve 122 in the open condition during operation of the machine tool 62, it is necessary to continuously press the shuttle 146 against the check valve 122 under the influence of fluid pressure in the chamber 148. The chamber 148 is connected in continuous fluid communication with the manifold ring 116 by conduit 104 which includes passages 158 and 159 (see FIG. 11) in the motor cylinder 124. Although the construction of the passages 158 and 159 and the manner in which they proceed through the motor cylinder 24 has not been fully illustrated in the drawings, it should be understood that it is generally similar to the manner in which the passages 124, 126 and 128 are formed in the motor cylinder 24.

The check valve assembly 34 cooperates with the motor chamber 26 in much the same manner as in which the check valve assembly 32 cooperates with the motor chamber. However, during normal operation of the machine tool 64, the check valve assembly 34 is effective to port high pressure fluid conducted from the manifold ring 116 through a passage 162 (FIG. 2) to the right end portion 80 (FIG. 10) of the motor chamber 26. Thus, the check valve assembly 34 includes a check valve 166 (FIG. 2) of the same construction as the check valve 122. The check valve 166 is effective to port high pressure fluid to a passage 170 which is connected with the right end of the motor chamber 26 by a passage 172 (see FIG. 4).

The check valve assembly 34 includes a shuttle 176 (see FIG. 2) of the same construction as the shuttle 146. A shuttle chamber 178 (see FIGS. 2 and 5) has the same construction as the shuttle chamber 148 of FIG. 11 and is connected with the manifold ring 118 (see FIG. 1) by conduit 101 (FIG. 10) formed in the cylinder 24. The conduit 101 includes a passage 184 (see FIG. 5) which connects the shuttle chamber 178 in fluid communication with a passage 186 (FIG. 1) The passage 186 is in turn connected with the manifold ring through passages 190 and 192.

If the conduit 94 should be accidentally broken during operation of the machine tool 62, the check valve assembly 34 will prevent the exhausting of a relatively large quantity of fluid from the right end portion 80 of the motor chamber 86. Thus, as soon as the conduit 94 is broken with a resulting drop in the fluid pressure conducted to the manifold ring 116 (FIG. 1) and the check valve 166 (FIG. 2), the check valve closes. During operation of the check valve 166 to the closed condition, a small quantity of fluid passes through the check valve 166. In the absence of the compensator assemblies 38, this loss of even a small quantity of fluid would result in a reduction in the fluid pressure in the end portion 80 of the motor chamber 26 with a resulting reduction in the force applied by the piston 28 to the chuck actuator shaft 76. Of course, this results in a reduction in the force urging the chuck jaws 72 to the closed condition.

To maintain the fluid pressure in the end portion 80 of the motor chamber 26 substantially constant upon a breaking of the conduit 94, as fluid is lost from the motor chamber the springs 52 are effective to move the piston 46 outwardly from the retracted position shown in FIG. 12 to an extended position adjacent an annular stop surface 198. This outward movement of the piston 46 results in an increase in the size of the variable volume spring chamber 56. As this occurs, the size of the variable volume portion 58 of the auxiliary chamber 42 is reduced with a resulting discharge of a small quantity of fluid to the right end portion 80 of the motor chamber 26 to thereby make up for the fluid which was lost upon closing of the check valve 166. This results in the fluid pressure in the right end portion 80 of the motor chamber 26 being maintained substantially constant so that the force applied by the piston 28 urging the chuck jaws 72 to the closed condition remains constant.

When the actuator assembly 20 is utilized with a push-out type chuck, the left motor chamber 84 is pressurized during operation of the machine tool 62 to continuously push the piston 28 and chuck actuator shaft toward the right to cause the chuck jaws to grip the workpiece. If the conduit 98 should be broken during operation of a machine tool with a push-out chuck, the check valve 122 would close to prevent the exhausting of a relatively large quantity of fluid from the left end portion 84 of the motor chamber 26. However, compensator assemblies 38 would make up for the relatively small quantity of fluid which would be lost through the check valve 122 as it closes.

To enable the actuator assembly 20 to be utilized with both pull-back and push-out type chucks, the compensator assemblies 38 are mounted on the piston 28 with the head end surfaces 48 of the auxiliary pistons 46 facing both toward the right end portion 80 of the motor chamber 26 (see FIGS. 6 and 12) and toward the left end portion 84 of the motor chamber 26 (see FIG. 1). The compensator assemblies 38 are disposed in an annular array about the central axis of the piston 28 (see FIG. 7) with alternate compensator assemblies facing in opposite directions. To facilitate the mounting of the compensator assemblies 38 in the piston 28, the piston 28 is advantageously made of two sections 194 and 196 (see FIG. 6) which are fixedly interconnected by fasteners 198 in the manner shown in FIG. 8. A plurality of indexing pins 202 (see FIG. 9) are provided to locate the two sections 194 and 196 of the piston relative to each other. Axial movement of the piston 28 in the motor chamber 26 is guided by a pair of guide rods 208 (only one of which is shown in FIG. 1). The guide rods 208 extend through openings or holes 212 (FIGS. 6 and 7) formed in an annular flange portion 214 of the piston 28. The annular flange portion 214 of the piston 28 is disposed in sliding engagement with the cylindrical wall of the motor chamber 26. An annular seal 218 (see FIG. 1) circumscribes the piston and is disposed in sealing engagement with the cylinder wall 222.

Although the check valve assemblies 32 and 34 have been illustrated as utilizing cartridge type check valves 122 and 166 in association with shuttle type actuators 146 and 176, it is contemplated that other types of check valves could be associated with shuttle valves which are spaced apart from the check valves and are effective to direct fluid to the check valves to enable them to cooperate with the motor chamber in the same manner as in which the check valves 122 and 166 cooperate with the motor chamber 26. It is also contemplated that the construction of the compensator assemblies 38 could be changed from the specific preferred embodiment illustrated in the drawings. Thus, the piston mounted compensator assemblies could be formed by a pair of annular ring members which circumscribe the piston 28 and cooperate with pins which are fixedly mounted on the flange portion 214 of the piston. If this was done, it is contemplated that the pins would be telescopically received in cylindrical openings in the annular ring members to form variable volume chambers in which biasing springs would be disposed. The biasing springs would be compressed under the influence of fluid pressure forces applied against the annular ring members and would be effective to cause the variable volume spring chambers to increase in volume to compensate for a loss of fluid upon closing of an associated check valve assembly.

In view of the foregoing description it is apparent that an improved chuck actuator assembly 20 is effective to maintain a substantially constant force urging a chuck 64 toward a closed condition upon breaking of a high-pressure fluid supply conduit 94 or 98 to the chuck acutator assembly. The chuck actuator assembly 20 includes a check valve 34 which is closed upon breaking of the high-pressure fluid conduit 94 to prevent the exhausting of large quantities of fluid from the motor chamber 26. However as the check valve 34 closes, a relatively small quantity of fluid is lost from the motor chamber 26 of the chuck actuator assembly 20.

In accordance with a feature of the present invention, a plurality of identical compensator assemblies 38 are provided to maintain the fluid pressure in the motor chamber 26 substantially constant by compensating for the small quantity of fluid which is lost upon closing of the check valve. Each pressure compensator assembly includes a piston 46 which is movable under the influence of a biasing spring 52. In a specific preferred embodiment of the invention, movement of the piston 46 is effective to discharge fluid from an auxiliary chamber 42 to the motor chamber 26 to make up for the fluid which is lost upon operation of the check valve. In order to simplify hydraulic connections with the actuator motor 22, the pressure compensator assemblies 38 are advantageously mounted on the main piston 28 of the actuator motor 22 and are rotated with the motor 22 and the chuck 64 during operation of the machine tool 62. Although a plurality of compensator assemblies 38 have been provided to maintain fluid pressure in the end portion 80 of the motor chamber 26, it is contemplated that under certain circumstances only one compensator assembly 38 may be used.

I claim:

1. A machine tool for performing operations on a workpiece, said machine tool comprising chuck means for gripping the workpiece during operation of said machine tool, said chuck means being operable between an open condition in which said chuck means is ineffective to grip the workpiece and a closed condition in which said chuck means is effective to grip the workpiece, motor means operable under the influence of fluid pressure to effect operation of said chuck means from the open condition to the closed condition and to apply forces to said chuck means to maintain said chuck means in the closed condition during operation of said machine tool, said motor means including a motor piston and a motor cylinder which at least partially define a motor chamber, said motor piston and cylinder being relatively movable under the influence of fluid pressure forces in said motor chamber to effect operation of said chuck means from the open condition to the closed condition and being effective during operation of said machine tool to urge said chuck means toward the closed condition with a force which varies as a direct function of variations in the fluid pressure in said motor chamber, conduit means for connecting said motor chamber with a source of fluid under pressure during operation of said machine tool, check valve means operable from an open condition to a closed condition in response to a reduction in the fluid pressure in said conduit means during operation of said machine tool to prevent the discharge of a large quantity of fluid from said motor chamber, said check valve means being ineffective to prevent the loss of a small quantity of fluid from said motor chamber upon operation of said check valve means from the open condition to the closed condition, and force maintaining means disposed within said motor cylinder for maintaining the forces urging said chuck means toward the closed condition substantially constant upon operation of said check valve means from the open condition to the closed condition, said force maintaining means including compensator means mounted on said motor piston for maintaining the fluid pressure in said motor chamber substantially constant by compensating for said loss of a small quantity of fluid upon operation of said check valve means from the open condition to the closed condition, said compensator means including surface means disposed on said motor piston for at least partially defining a compensator cylinder having an open end portion which is directly exposed to the fluid pressure in said motor chamber, a compensator piston disposed on said motor piston within said compensator cylinder and movable relative to said motor piston between a first position in which the open end portion of said compensator cylinder has a first volume and a second position in which the open end portion of said compensator cylinder has a second volume which is larger than said first volume, and spring means disposed on said motor piston within said compensator cylinder for urging said compensator piston toward said first position, said compensator piston being movable from said first position to said second position against the urging of said spring means under the influence of fluid pressure conducted from said motor chamber to said compensator cylinder upon operation of said chuck means from the open condition to the closed condition, said compensator piston being movable from said second position toward said first position under the influence of said spring means upon operation of said check valve means from the open condition to the closed condition to effect a flow of a small quantity of fluid from said compensator cylinder to said motor chamber upon operation of said check valve means from the open condition to the closed condition.

2. A machine tool as set forth in claim 1 further including means for supporting said chuck means and said motor means for simultaneous rotation about a common axis, said compensator piston and compensator cylinder being connected with said motor means for rotation therewith about said axis.

3. A machine tool for performing operations on a workpiece as it is being rotated, said machine tool including rotatable chuck means for gripping the workpiece, said chuck means being operable between an open condition in which said chuck means is ineffective to grip the workpiece and closed condition in which said chuck means is effective to grip the workpiece, motor means supported for rotation with said chuck means and operable under the influence of fluid pressure to effect operation of said chuck means from the open condition to the closed condition and to apply forces to said chuck means to maintain said chuck means in the closed condition during rotation of said motor means and chuck means, said motor means including a motor piston and a motor cylinder which are relatively movable and cooperate to at least partially define a motor chamber, said motor piston and cylinder being relatively movable under the influence of fluid pressure in said motor chamber to effect operation of said chuck means from said open condition to said closed condition, conduit means for conducting fluid under pressure to said motor chamber to effect relative movement between said motor piston and cylinder and operation of said chuck means to the closed condition, check valve means operable from an open condition to a closed condition in response to a reduction in the fluid pressure in said conduit means during rotation of said motor means and said chuck means to prevent the discharge of a large quantity of fluid from said motor chamber, said check valve means being ineffective to prevent the loss of a small quantity of fluid from said motor chamber upon operation of said check valve means from the open condition to the closed condition, and compensator means mounted on said motor piston rotatable with said motor means for maintaining the fluid pressure in said motor chamber substantially constant upon operation of said check valve means from the open condition to the closed condition with the resulting loss of a small quantity of fluid from said motor chamber to thereby maintain the forces urging said chuck means toward the closed condition substantially constant, said compensator means including surface means disposed on said motor piston for at least partially defining a first variable volume chamber and spring means disposed on said motor piston in said first variable volume chamber for effecting an increase in the volume of said first variable volume chamber from a first volume to a second volume which is larger than said first volume upon operation of said check valve means for the open condition to the closed condition, said spring means being resiliently compressed from an expanded condition to a contracted condition and the volume of said first variable volume chamber being reduced from said second volume to said first volume under the influence of fluid pressure forces in said motor chamber upon operation of said chuck means from the open condition to the closed condition, said spring means being resiliently expanded from the compressed condition toward the expanded condition and the volume of said first variable volume chamber being increased from the first volume toward the second volume to maintain the fluid pressure in said motor chamber substantially constant upon operation of said check valve means from the open condition to the closed condition.

4. A machine tool as set forth in claim 3 further including surface means disposed on said motor piston for defining a second variable volume chamber connected in fluid communication with said motor chamber, said spring means being effective to reduce the volume of said second variable chamber to discharge fluid from said second variable volume chamber to said motor chamber upon operation of said check valve means from the open condition to the closed condition.

5. A machine tool for performing operations on a workpiece as it is being rotated, said machine tool including rotatable chuck means operable in either one of two directions to grip a workpiece, said chuck means being operable between an open condition in which said chuck means is ineffective to grip the workpiece and closed condition in which said chuck means is effective to grip the workpiece, double acting motor means operable under the influence of fluid pressure to effect operation of said chuck means in either one of the two directions from the open condition to the closed condition and to apply forces to said chuck means to maintain said chuck means in the closed condition during rotation of said chuck means, said double acting motor means including a motor piston and a motor cylinder which are relatively movable and cooperate to at least partially define first and second motor chambers, said motor piston and cylinder being relatively movable under the influence of fluid pressure in either one of said motor chambers to effect operation of said chuck means between said open and closed conditions, a pair of conduit means for conducting fluid under pressure to an associated one of said motor chambers to effect relative movement between said motor piston and cylinder and operation of said chuck means to the closed condition, first and second check valve means each of which is associated with one of said conduit means and is operable from an open condition to a closed condition in response to a reduction in the fluid pressure in the associated one said conduit means during rotation of said chuck means with fluid pressure in the associated one of said motor chambers to prevent the discharge of a large quantity of fluid from said motor chambers, each of said check valve means being ineffective to prevent the loss of a small quantity of fluid from the associated one of said motor chambers upon operation of said check valve means from the open condition to the closed condition, first and second compensator means each of which is mounted on said motor piston and is associated with one of said motor chambers for maintaining the fluid pressure in the associated one of said motor chambers substantially constant upon operation of either one of said check valve means from the open condition to the closed condition with the resulting loss of a small quantity of fluid from the associated one of said motor chambers to thereby maintain the forces urging said chuck means toward the closed condition substantially constant, each of said compensator means including variable volume chamber means disposed on said motor piston and connected in fluid communication with the associated one of said motor chambers, each of said variable volume chamber means being operable between a contracted condition and an expanded condition in which said variable volume chamber means holds a volume of fluid which is at least as great as the small quantity of fluid lost from the associated one of said motor chambers upon operation of the associated one of said check valve means from the open condition to the closed condition during rotation of said chuck means with fluid pressure in the associated one of said motor chambers, and means for effecting operation of said variable volume chamber means from the expanded condition toward the contracted condition to decrease the volume of said variable volume chamber means and discharge fluid from said variable volume chamber means into the associated one of said motor chambers upon operation of the associated one of said check valve means from the open condition to the closed condition.

* * * * *